April 5, 1927.
H. H. VERDERY
1,623,646
FLOWER POT TRELLIS
Filed Sept. 7, 1926
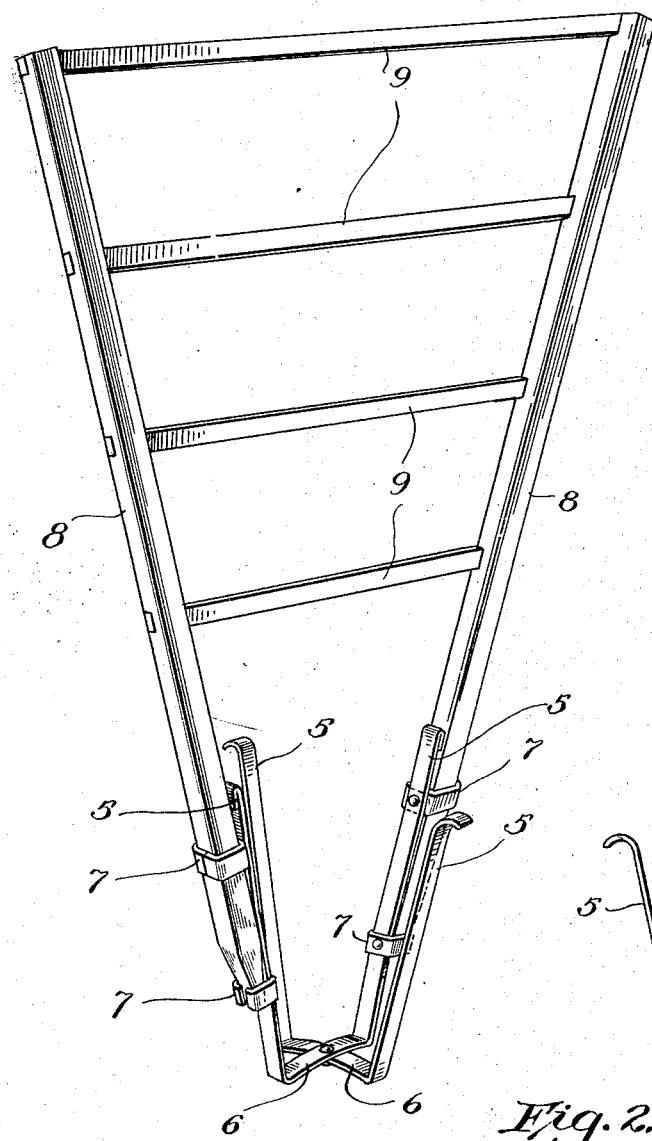
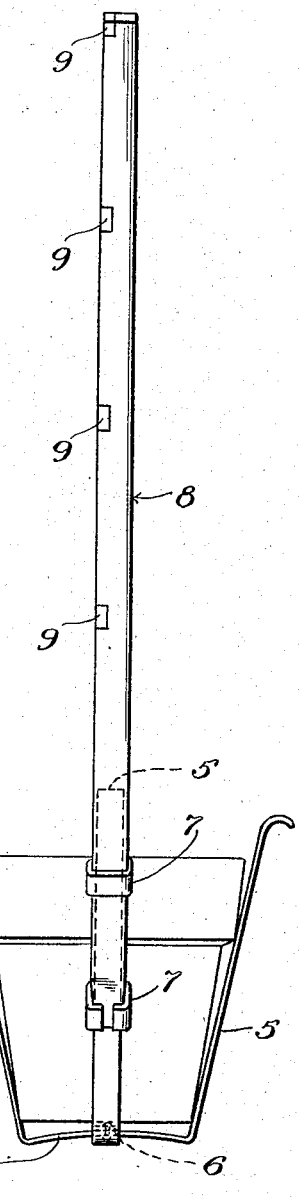
Inventor
Horace H. Verdery
By Davis & Davis
Attorneys Patented Apr. 5, 1927.

1,623,646

UNITED STATES PATENT OFFICE.

HORACE H. VERDERY, OF PHILADELPHIA, PENNSYLVANIA.

FLOWERPOT TRELLIS.

Application filed September 7, 1926. Serial No. 133,847.

The object of this invention is to provide a simple trellis-support for flower-pots, and the invention consists in certain novel features of construction hereinafter described and claimed.

In the drawing—

Fig. 1 is a perspective view of my improved device;

Fig. 2 is a side elevation thereof.

In the drawing annexed, 5 designates four upright metal bars secured together at their lower ends and spread apart toward their upper ends to form a cage for the reception of the flower-pot. The connection at the lower ends of the bars consists of horizontal bottom bars 6 crossing each other and riveted together at that point, these horizontal bars being formed integral with the respective upright bars.

On two of the opposite bars 5 are located open sockets 7, one pair being attached to each bar and the lower one of each bar being somewhat smaller than the companion upper socket. In each pair of these sockets is inserted a post 8, the lower end of the post being tapered off to give it a jam fit into the lower socket. These posts 8 flare outwardly with respect to each other and are connected by a series of trellis-bars 9.

With the device thus constructed, it will be observed that the pot may be readily inserted in and removed from the cage. The bars 5 that are not provided with sockets are resilient, tending to spring inwardly, thus serving to clasp the flower-pot and thus hold the flower-pot in place when the same is being carried about from place to place by using the trellis-frame as a handle. It will be observed that my device may be inexpensively constructed, since the bottom cross-bars and the uprights may be made by simply bending two pieces of scrap iron in proper shape and riveting them together, and the sockets also may be made of scrap iron folded to form square sockets and riveted to the pot-holding bars.

What I claim as new is:

1. A flower-pot trellis embodying a cage consisting of a series of upright bars flaring outwardly and connected together at their lower ends, said bars being separated sufficiently to form an open pot-receiver, one pair of opposite bars being provided with sockets, and a trellis-frame having posts anchored in said sockets.

2. A flower-pot trellis embodying a cage consisting of a series of upright bars flaring outwardly and connected together at their lower ends, said bars being separated sufficiently to form an open pot-receiver, one pair of opposite bars being provided with sockets, and a trellis-frame having posts anchored in said sockets, a pair of said upright bars being free at their upper ends and tending to spring inwardly to thus grasp the pot.

3. A flower-pot trellis embodying a cage consisting of a pair of crossed bottom-bars secured together at their intersection, the ends of said bottom-bars being bent upwardly and outwardly to form arms which together form a flaring receptacle for the pot, a trellis having posts, and means whereby these posts are attached to the exterior of a pair of said arms.

In testimony whereof I hereunto affix my signature.

HORACE H. VERDERY.